Dec. 1, 1959  L. F. WILLEMAIN  2,914,829
GRASS CATCHER CLAMPING DEVICE
Filed April 10, 1957
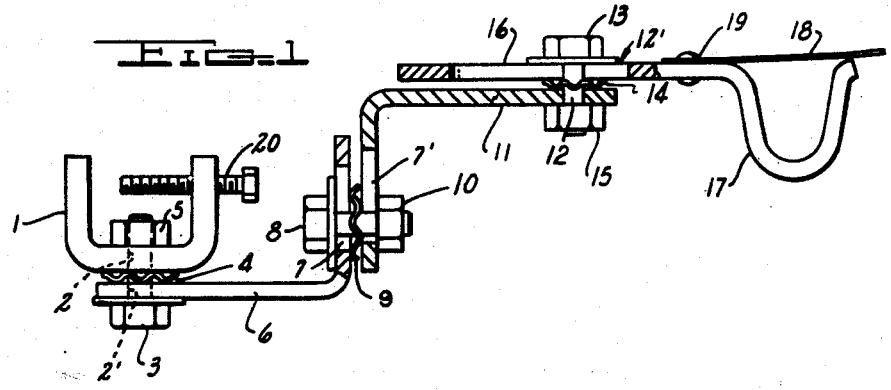
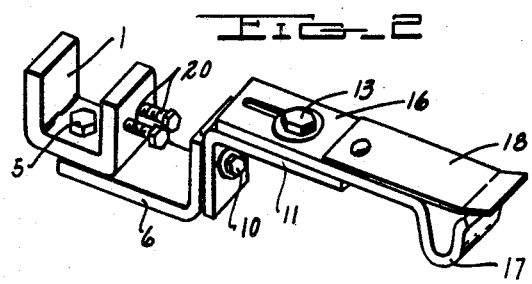
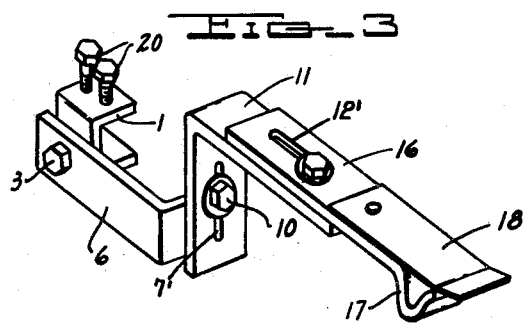
INVENTOR
*Louis F. Willemain*
*Kotts & Sheridan*
ATTORNEYS 2,914,829
GRASS CATCHER CLAMPING DEVICE Louis F. Willemain, Detroit, Mich.

Application April 10, 1957, Serial No. 652,055

7 Claims. (Cl. 24—81)

The present invention relates generally to a clamp for attaching a grass catcher to a lawn mower and more particularly to a universal clamp for attaching a grass catcher to any rotary mower.

One of the principal problems in the use of grass catchers on rotary mowers is that of attaching the grass catcher to any of the variety of rotary mower designs available. The rotary mowers may be made with castings, forgings, or stampings with a variety of shapes and thicknesses of metal where attachments for the grass catcher could be made. The rotary mowers vary in the manner in which the cut grass is disposed which may be from the sides, front or back of the rotary cutter. In addition, the front and rear wheels may vary in size as well as in spacing both in gauge width and from front to rear. Further, the clamping device must necessarily be universal in fittings, simple to attach and rugged enough to withstand the vibration attendant to rotary mowers.

The present invention offers a solution to all of the foregoing problems in that a series of elements are combined to form a simple clamping device that allows rotary and straight line adjustments in all three dimensions.

The principal object of the present invention is to provide a clamping device for attaching a grass catcher to a rotary mower that can be universally used for any rotary mower.

Another object of the present invention is to provide a clamping device that can be adjusted rotatably or in straight lines in any of the three dimensions to obtain the necessary ground and mower clearances.

A further object is to provide a clamping device that is simple to attach, necessitating no work on the rotary mower, and which is inexpensive.

In the drawings:

Fig. 1 is an elevational view partially broken away of the grass catcher clamping device embodying the present invention.

Fig. 2 is a perspective view of Fig. 1.

Fig. 3 is a perspective view of the device illustrated in Fig. 1, repositioned.

Other objects of this invention will appear in the following description and appended claims, reference being had to the accompanying drawings forming a part of this specification wherein like reference characters designate corresponding parts in the several views.

Figure 1 shows one form of the universal clamping device which is comprised of a U-shaped element 1 for fitting onto any rotary mower cover with a screw or screws at 20 for tightening onto the cover with an opening at 2 for a pin, bolt 3, lock washer 4 and nut 5 for joining element 1 to element 6 at opening 2'. An L-shaped element 6 with an opening at 2' wherein element 1 is joined by a bolt 3, lock washer 4 and nut 5 allowing element 1 to be swiveled to any position required for a particular mower cover in relation to the L-shaped element 6 and there fastened into a fixed position. On the other leg of the L-shaped element 6 is a slot 7 allowing the L-shaped element 6 to be adjusted vertically or rotatably in relation to the second L-shaped element 11 through a bolt 8, lock washer 9, nut 10 at 7. The second L-shaped element 11 has a slot at 7' through which it is joined with L-shaped element 6 and an opening 12 through which it is joined with element 16 allowing it to be rotated about element 16. The element 16 has a U-shaped hook at 17 for holding a grass catcher and a slot 12' in the straight portion allowing element 16 to be moved backwards and forwards in relation to element 11 as well as to be rotatably adjustable in relation to element 11. A spring element 18 is fastened at one end 19 to element 16 and the free end of element 18 covers the opening in the hook element 17.

Figure 2 shows one possible arrangement of the clamping device described in Figure 1.

Figure 3 shows another possible arrangement of the elements described in Figure 1.

In use, element 1 can be rotated to allow the clamp to conform to the curvature of the mower body. The screws 20 are then tightened onto the mower body to hold the clamp rigidly in place. The rigidity is achieved by tightening nut 5 onto bolt 3 thereby exerting pressure on lockwasher 4. The height of the grass catcher above the ground can be adjusted by sliding element 6 up or down with the bolt 8 riding in the slot 7. Also element 6 can be rotated about bolt 8 where element 1 is required to have its opening vertical rather than horizontal as shown. When element 6 is properly adjusted, nut 10 is tightened onto bolt 8 causing pressure to be exerted on the lockwasher 9. The position of element 16 is then adjusted by allowing the element 16 to be rotated about bolt 15 or by adjusting the position of bolt 15 in the slot 12' of element 16. These adjustments allow the clamp to be adjusted at angles and with horizontal spacing to conform to the various dimensions and configurations of rotary mower bodies that are available. Element 16 terminates in a U-shaped hook element 17 which is used to accommodate the leading edge of a grass catcher. The element 18 is made of a resilient material which can be sprung apart from the hook element 17 allowing the leading edge of a grass catcher to enter the clamping device and then preventing the leading edge of the grass catcher from jumping out of place as rough terrain is encountered by the rotary mower or by any attendant vibration. The material used is a heavy gauge steel although other metals could also be used.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Having thus described my invention, I claim:

1. In a clamping device having three pivotal joints, the combination of a flat strip of narrow material formed into a U-shaped member; clamp means on said U-shaped member; a first and second L-shaped member of generally flat narrow material; said L-shaped members each having long and short leg portions; said U-shaped member being pivotally affixed intermediate its ends to a flat surface on the long leg of said first L-shaped member; the short flat leg of said first L-shaped member being pivotally affixed to the short flat leg of the second L-shaped member; a generally flat member; the long flat leg of said second L-shaped member being pivotally secured to said generally flat member; and a hook on the free end of said generally flat member.

2. In a clamping device having three pivotal joints, the combination of a flat strip of narrow material formed into a U-shaped member; clamp means on said U-shaped member; a first and second L-shaped member of generally flat narrow material; said L-shaped members each having long and short leg portions, the short leg of each member having a slot therein; said U-shaped member being pivotally affixed intermediate its ends to a flat surface on the long leg of said first L-shaped member; the short flat slotted leg of said first and second L-shaped member being pivotally joined; a generally flat member; the long flat leg of said second L-shaped member pivotally secured to said generally flat member; and a hook on the free end of said generally flat member.

3. In a clamping device having three pivotal joints, the combination of a flat strip of narrow material formed into a U-shaped member; clamp means on said U-shaped member; a first and second L-shaped member of generally flat narrow material; said L-shaped members each having long and short leg portions, the short leg of said members having a slot therein; said U-shaped member being pivotally affixed intermediate its ends to a flat surface on the long leg of said first L-shaped member; the short flat leg of said first L-shaped member being pivotally affixed to the short flat leg of the second L-shaped member; a generally flat member; the long flat leg of said second L-shaped member being pivotally secured to said generally flat member; and a hook on the free end of said generally flat member.

4. In a clamping device having three pivotal joints, the combination of a flat strip of narrow material formed into a U-shaped member; clamp means on said U-shaped member; a first and second L-shaped member of generally flat narrow material; said L-shaped members each having long and short leg portions; said U-shaped member being pivotally affixed intermediate its ends to a flat surface on the long leg of said first L-shaped member; the short flat leg of said first L-shaped member being pivotally affixed to the short flat leg of the second L-shaped member; the long leg of said second L-shaped member having a slot therein for adjustment; a generally flat narrow member; the long flat leg of said second L-shaped member being pivotally secured to said generally flat member; and a hook on the free end of said generally flat member.

5. A device as in claim 4, wherein a generally flat resilient member covers the open portion of said U-shaped hook; said hook portion and said resilient member adapted to retain and position a grass catcher.

6. In a clamping device having three pivotal joints, the combination of a flat strip of narrow material formed into a U-shaped member; clamp means on said U-shaped member; a first and second L-shaped member of generally flat narrow material; said L-shaped members each having long and short leg portions; said U-shaped member being pivotally affixed intermediate its ends to a flat surface on the long leg of said first L-shaped member; tensioning means interposed between said U-shaped member and said L-shaped leg; the short flat leg of said first L-shaped member being pivotally affixed to the short flat leg of the second L-shaped member; a second tensioning means interposed between the short legs of said first and second L-shaped members; the short leg of said second L-shaped member having a slot therein for receiving the said second tensioning means; a generally flat member; the long flat leg of said second L-shaped member pivotally secured to said generally flat member; and a hook on the free end of said generally flat member.

7. In a grass catcher clamping device for use with a lawn mower, the combination comprising two right angled elements having free legs rotatably and slidably joined, the free legs extending in opposite directions; a U-shaped element rotatably mounted on one of the free legs of said right angled elements; adjustable means on said U-shaped element adapted to control the position of said element; a straight element rotatably and slidably mounted on the free leg of said right angled element; a hook shaped element formed on the free end of said straight element; a flat spring element affixed on said straight element; the free end of said flat spring element extending over said hook.

References Cited in the file of this patent
UNITED STATES PATENTS
2,366,695    Bisheff _____ Jan. 9, 1945